United States Patent [19]

Hull et al.

[11] Patent Number: 5,554,583
[45] Date of Patent: Sep. 10, 1996

[54] PERMANENT MAGNET DESIGN FOR HIGH-SPEED SUPERCONDUCTING BEARINGS

[76] Inventors: John R. Hull, 5519 S. Bruner, Hinsdale, Ill. 60521; Kenneth L. Uherka, 830 Ironwood, Frankfort, Ill. 60423; Robert G. Abdoud, 13 Country Oaks La., Barrington Hills, Ill. 60010

[21] Appl. No.: 303,017

[22] Filed: Sep. 8, 1994

[51] Int. Cl.⁶ ................................................. F16C 39/00
[52] U.S. Cl. ...................... 505/166; 310/90.5; 335/216; 505/876; 505/879
[58] Field of Search .......................... 310/90.5; 335/216; 505/166, 876, 879

[56] References Cited

U.S. PATENT DOCUMENTS 5,196,748  3/1993  Rigney ................................... 310/90.5
5,220,232  6/1993  Rigney, II et al. ..................... 310/90.5
5,330,967  7/1994  Takahata et al. ....................... 505/166

*Primary Examiner*—Brian W. Brown
*Assistant Examiner*—Raymond M. Barrrera
*Attorney, Agent, or Firm*—Reinhart, Boerner, Van Deuren, Norris & Rieselbach, s.c.

[57] ABSTRACT

A high temperature superconducting bearing including a permanent magnet rotor levitated by a high temperature superconducting structure. The rotor preferably includes one or more concentric permanent magnet rings coupled to permanent magnet ring structures having substantially triangular and quadrangular cross-sections. Both alternating and single direction polarity magnet structures can be used in the bearing.

14 Claims, 3 Drawing Sheets

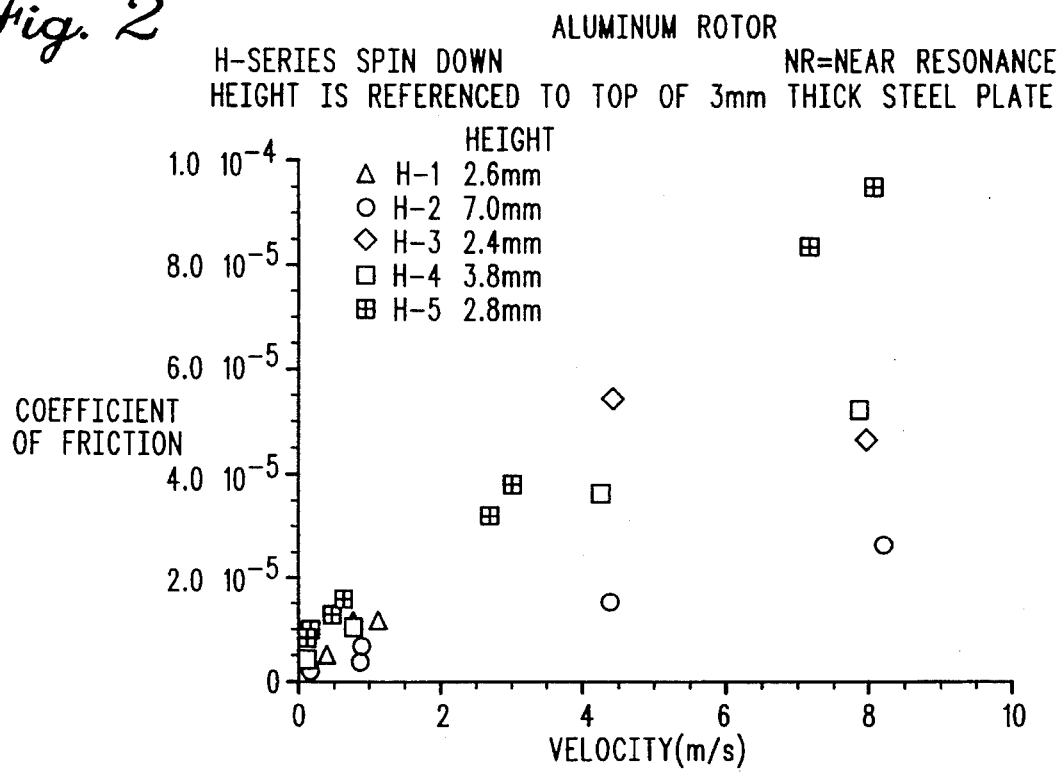
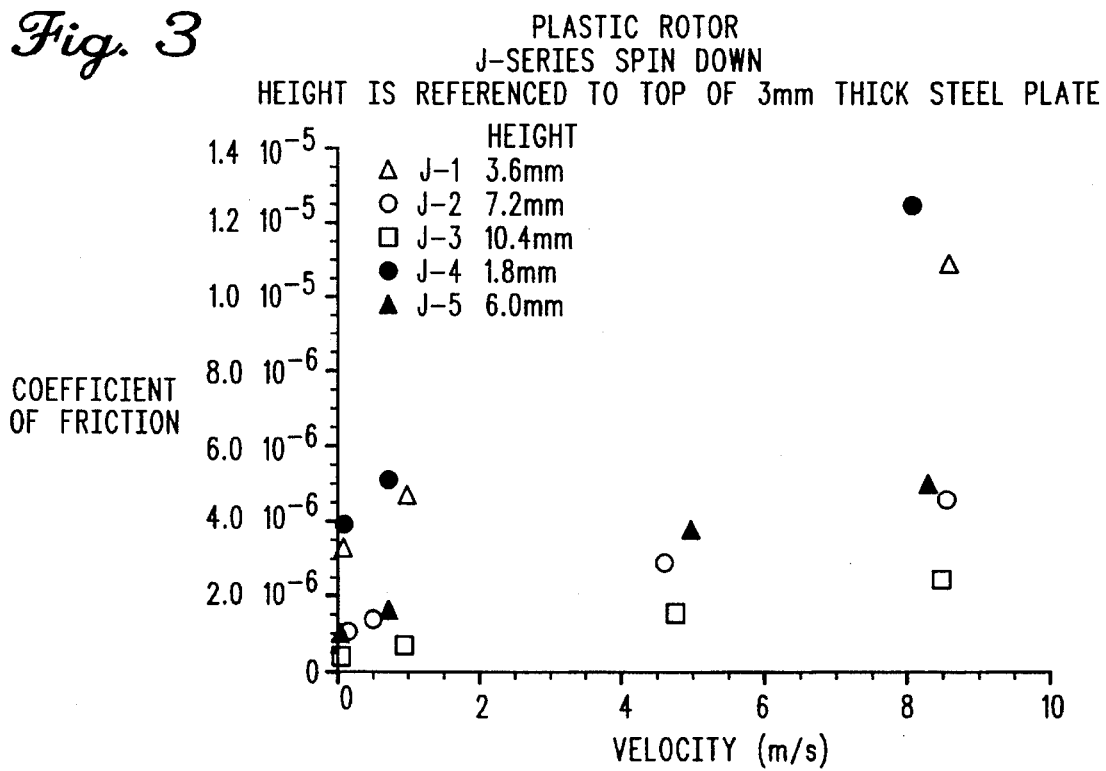

PERMANENT MAGNET DESIGN FOR HIGH-SPEED SUPERCONDUCTING BEARINGS

CONTRACTUAL ORIGIN OF THE INVENTION

The United States Government has rights in this invention pursuant to Contract No. W-31-109-ENG-38 between the U.S. Department of Energy and The University of Chicago, representing Argonne National Laboratory.

BACKGROUND OF INVENTION

The present invention relates generally to configurations of permanent magnets on a rotating member of a magnetic or superconducting bearing useful for flywheel energy storage and other rotating machinery that incorporate superconducting bearings. More particularly, the present invention relates to magnetic bearing designs encompassing a combination of permanent magnets and high-temperature superconductors (HTSs) which are capable of large levitation pressure, low eddy current loss, and good mechanical integrity at high speeds.

When these bearings are used in flywheel energy storage devices, the efficiency of the flywheel can be very high and flywheels of this type become economic for diurnal energy storage and other applications where high energy efficiency is important. Storage of electrical energy is useful in a number of applications. Diurnal storage of electricity is important to electric utilities in order to efficiently utilize base load generating plants and to meet the varying load demands of their customers. In this example, the base load plants can charge the storage units at night when demand is low, and then peak demands can be met by discharging the storage during the daytime peak hours. Energy storage can also play a substantial role in eliminating or postponing the installation of power lines with larger capacity. Power can be transmitted at night to a substation or user energy storage unit when demand is low, and then during peak power times, the energy storage units can be discharged. The placement of energy storage units can occur in various parts of the electrical distribution system: utility parks where large amounts of energy are stored; in tandem with photovoltaic or wind energy generation facilities that are time dependent; substation units; individual companies and houses. The invention can also be used for energy storage on electric vehicles such as cars and buses, or as wayside energy storage for electric trains or other transit vehicles.

Flywheels are often considered for energy storage applications. Their primary advantages are modularity, mechanical simplicity (low cost), high energy storage density (Wh/kg), and high efficiency input and output of electrical energy. The ability to produce high strength flywheel rotors and the ability to efficiently transfer energy in and out of a flywheel are well known and will not be discussed in this disclosure.

The primary disadvantage of conventional flywheels is inefficiency in standby storage mode. These losses occur because the bearings that support the flywheel structure have high losses. The present invention provides bearings having a very low rotational loss and can enable standby losses in flywheels to be 0.1%/hr or less. HTS bearings provide passive stability in all directions; i.e., they provide a positive stiffness in all displacement directions. Further, they allow rotational motion with very low friction.

A preferred HTS bearing embodiment of the invention uses permanent magnets, such as FeBNd or SmCo, on the rotor. For a large bearing, a permanent magnet ring or series of concentric rings is levitated over HTS elements, as shown in FIG. 1A. In order to maximize the levitation pressure, it is desirable to connect two or more magnet rings with a low-reluctance magnetic flux rerun path on top of the rings, as shown in FIG. 1A. This can be accomplished with a material of high magnetic permeability, such as Permendur brand high magnetic permeability material or magnetic steel.

One of the difficulties with HTS bearings is that for a large bearing, individual pellets or tiles of HTS must be arranged under the permanent magnet on the rotor. It is not yet possible to grow large, high-quality HTSs as one piece. Each of the HTS tiles will have its own magnetic field associated with it and present to the rotating permanent magnet and rotor an equivalent alternating current magnetic field. This can cause eddy currents in any conductor that is rotating with the rotor. In a first experiment, a permanent magnet ring was rotated with an aluminum rotor attached to it. A plastic rotor was attached to the permanent magnet ring in a second experiment. At the same levitation height, the rotational drag with the aluminum rotor was about an order of magnitude higher than with the plastic rotor. The results are shown in FIGS. 2 and 3. These experiments verify the importance of minimizing the eddy currents produced by the HTS tiles in the rotor to achieve a low-friction bearing.

In the preferred embodiments of the invention, the permanent magnets should have good mechanical integrity. Because these permanent magnets tend to have low mechanical strength, the present invention includes banding the magnets at intermediate locations so that they do not break apart due to the high centrifugal forces that they experience at high rotational speeds. Further, as noted previously, eddy currents can cause substantial rotational losses which can be lessened by selecting suitable banding materials.

It is therefore an object of the invention to provide an improved low-loss bearing and method of use that can be used to achieve a high-efficiency flywheel energy storage device.

It is a further object of the invention to provide a novel configuration and method of use of permanent magnets on the rotor that minimizes the eddy currents produced from the magnetic fields in an array of HTS tiles.

It is another object of the invention to provide an improved permanent magnet configuration and method of use that produces high levitation force.

It is yet another object of the invention to provide a novel design and method of use in which the permanent magnets can be spun at high rotational speed and maintain mechanical integrity.

It is a further object of the invention to provide an improved apparatus and method for reducing rotational losses and increasing structural integrity of rotating structures in superconductor applications.

It is another object of the invention to provide a novel banding configuration and method of use which reduces production costs by requiring only simple cutting operations to yield a structure capable of withstanding high centrifugal forces.

It is yet another object of the invention to provide an improved permanent magnet configuration for a superconducting bearing using an alternating polarity magnet configuration yielding balanced magnetic flux between individual components of the configuration.

Other advantages and features of the invention, together with the organization and the manner of operation thereof,

BRIEF DESCRIPTION OF THE DRAWINGS

FIG. 2 illustrates aluminum rotor spin-down data;

FIG. 3 shows plastic rotor spin-down data;

DETAILED DESCRIPTION OF PREFERRED EMBODIMENTS

Figure 1A:
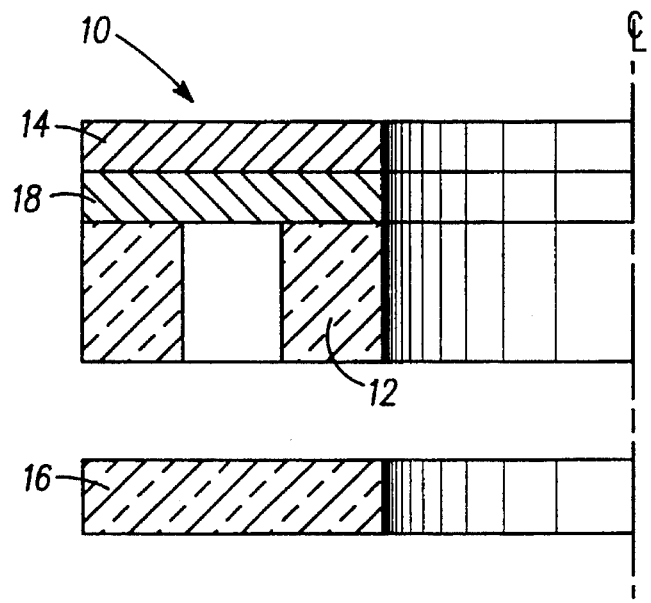
FIG. 1A illustrates a permanent magnet double ring rotor having a low-reluctance magnetic flux rerun path on top of the ring levitated over a high temperature superconductor structure.
Figure 1B:
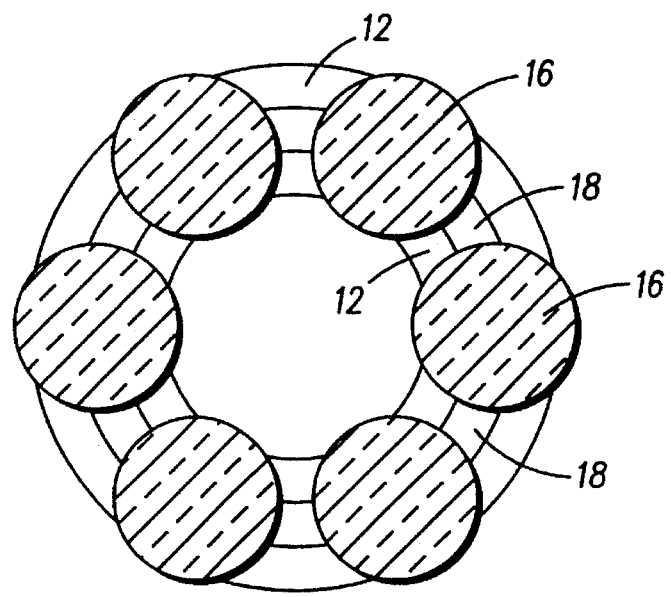
FIG. 1B shows a bottom view of the configuration shown in FIG. 1A, with a plurality of superconducting structures arranged beneath the rotor.
Figure 4:
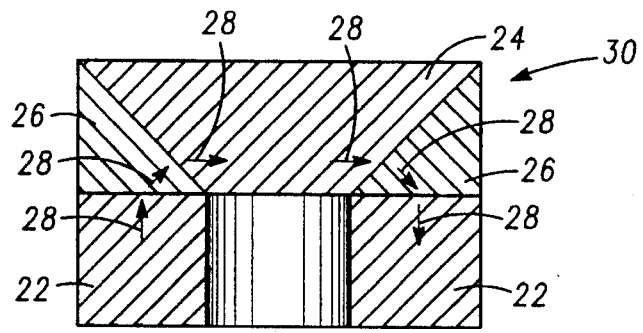
FIG. 4 illustrates a cross-sectional view of an unbanded, sectional permanent magnet double ring structure.
Figure 5:
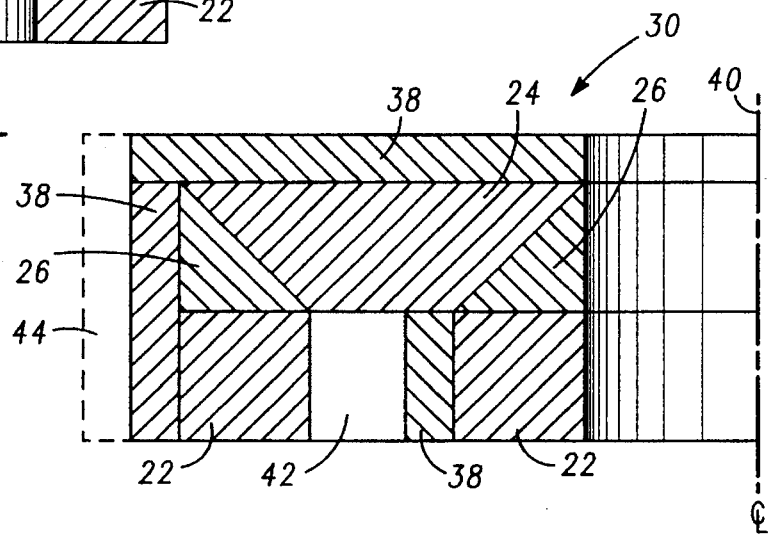
FIG. 5 shows the permanent magnet structure of FIG. 4 with intermediate banding.
Figure 6:
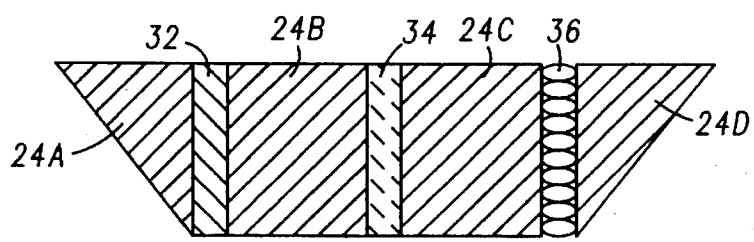
FIG. 6 illustrates alternate banding embodiments of the invention.

Referring to the figures, and particularly to FIGS. 1A and 1B, permanent magnet components of an HTS bearing 10 for flywheel/rotor applications are shown. Permanent magnet rings 12 (ring 22 in FIGS. 4 and 5) are attached to a flywheel rotor 14 including a high magnetic permeability material structure, and are levitated over an array of HTS elements 16 as discussed previously. Portions of the flywheel rotor 14 immediately above, or in the near vicinity of, the array of HTS elements 16 are preferably constructed of non-conducting materials (to the greatest extent possible) to minimize eddy current losses. FIGS. 4 through 6 are cross-sectional views that illustrate embodiments of the permanent magnet ring 12 aspect of the invention only, and are discussed hereinafter. While specific orientations have been shown for nonlimiting, illustrative purposes, it will be apparent to one of ordinary skill in the art that the bearings of the invention can be operated in any orientation, including inverted, with the permanent magnet suspended from the superconductor structure, or horizontal with the permanent magnet next to the superconductor structure. Further, the invention even works in "weightless" environments.

A highly preferred embodiment of the invention is shown in FIG. 4. A configuration is shown of a pair of permanent magnet rings 22 that does not provide a low reluctance return on top of the two permanent magnet rings 22. In this embodiment, the high magnetic permeability material structure (see FIG. 1A) is replaced by several permanent magnet pieces 30. The permanent magnet pieces 30 preferably comprise magnetic rare earth-iron materials such as neodymium, iron, and boron, or praseodymium, iron and boron. Specifically manufactured mixtures, such as a mixture of neodymium and praseodymium may also be used. Here the levitation pressure is the same or greater than that shown in FIGS. 1A and 1B.

Because there is no conducting material used in the HTS bearing 10, the eddy currents are reduced. Eddy currents are small in the permanent magnet pieces 30 because of their small and electrically isolated particles. FIG. 4 shows a permanent magnet configuration that can be fabricated from five easily cut permanent magnet pieces 30. Rectangular pieces 22 comprise rings having cross-sectional areas which are rectangular in shape and most preferably square. Rectangular pieces 22 are shown in cross-section in FIG. 4, indicating that the rings formed by rectangular pieces 22 are concentric and separated only by the length of the bottom side of quadrangular piece 24. Two more concentric rings illustrated in cross-section by triangular pieces 26 are coupled to the rectangular pieces 22 and quadrangular piece 24 as shown in FIG. 4. Substantially quadrangular piece 24 separates the concentric rectangular pieces 22 and triangular pieces 26 described. Magnetic flux travels generally along the path shown by the arrows in FIG. 4. Other cutting strategies and variations on this basic geometry are possible to optimize magnetic flux flow and achieve good mechanical integrity of the permanent magnet configuration. It will be apparent that larger numbers of magnet rings can be used in accordance with the invention, including alternating or single-direction polarity configurations.

In addition to comprising easy-to-cut pieces, the configuration shown in FIG. 4 also optimizes flux levels at the pole faces of the rotor structure 30. The magnetization of the pieces is illustrated in FIG. 4, showing the path which the flux 28 follows through the rotor structure 30. This path presents as few gaps as possible, thereby decreasing the reluctance of the path. The easy-to-cut aspects of this "structure" are especially helpful here, wherein tightly meshing surfaces can be readily achieved. Further, angle and inclination should be substantially perpendicular to the flux 28 for optimization of flux levels at the pole faces. Magnetization shown in FIG. 4 accomplishes this through near-optimal angle of inclination with respect to the flux 28. Accordingly, this orientation of specially magnetized pieces of the present invention gives rise to significant advantages over prior art structures.

In order to give the permanent magnet ring 22 mechanical integrity at the high rotational velocities of the invention, it is desirable to band the permanent magnet ring 22 with some high strength material as shown in FIG. 5. The banding keeps the weaker members of the permanent magnet ring 22 under compression until they attain the desired rotational velocity. At preferred rotational speeds, the net force on the banded permanent magnet ring 12 is small and easily borne by their low mechanical strength. Preferably, the banding material comprises fiber reinforced composites which help minimize eddy current losses. Another possibility for the banding is nonmagnetic material (such as nonmagnetic steel) or magnetic material (such as magnetic steel). Because the permanent magnet ring 22 comprises small pieces, the small pieces can grow with the banding material or other support structure. The spaces between the small pieces act as controlled cracks, greatly increasing the strength of the permanent magnet ring 22 above the low tensile strength of the individual small pieces.

As shown in FIG. 5, the rectangular pieces 22, quadrangular piece 24 and triangular pieces 26 can be banded both radially and perpendicular to the axis of rotation 40 of the rotor structure 30 with banding 38. As discussed previously, various nonmagnetic or magnetic materials can be used, although nonmagnetic materials are preferred for reducing eddy current losses. Further, the U-shaped space 42 between the banding 38 can be partially or totally filled with substantially rigid material such as epoxy. Filling the U-shaped space 42 in this way allows transfer of forces from inner portions of the banding 38 and rectangular pieces 22 to outer portions of the banding 38. Alternatively, a durable shell 44 can be provided around the banding 38 to contain the centrifugal forces passed through the rotor structure 30.

In order to give the permanent magnet ring 22 even more mechanical rigidity, it is desirable to divide quadrangular piece 24 (shown in FIG. 4) into several segments 24A, 24B, 24C and 24D. The other pieces of the permanent magnet ring 22 could be similarly divided if desired. FIG. 6 illustrates one way to divide quadrangular piece 24 and shows several different ways to band the quadrangular piece 24. Each of these banding methods could be used in part or entirety in the rotor structure 30 shown in FIG. 5. Element 32 represents a Kevlar or carbon fiber composite band. Element 34 represents a steel band. Element 36 represents a series of steel wires. Element 36 has less eddy currents than the steel bands of Element 34. The nonconducting Kevlar of Element 32 has no eddy currents and is the most preferred embodiment for banding. Each of Elements 32, 34, or 36 can be composed of more than one layer.

Figure 7:
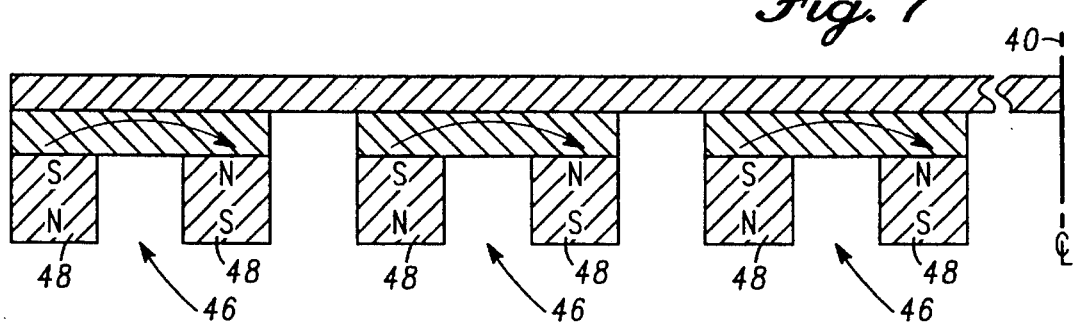
FIG. 7 shows a single direction polarity concentric ring rotor.
Figure 8:
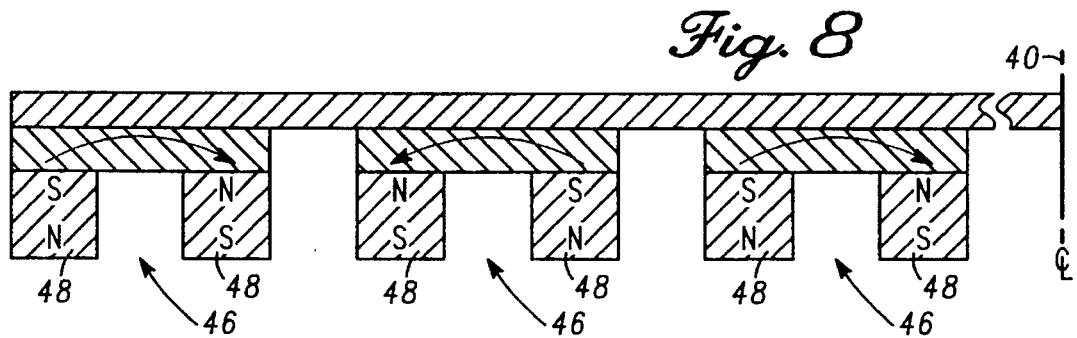
FIG. 8 illustrates an alternating polarity concentric ring rotor.

To increase the levitation force or radial stiffness capability of a specific bearing application, multiple concentric bearing assemblies can be combined to form a composite bearing assembly as shown in FIGS. 7 and 8. In one preferred embodiment, the magnet assemblies are arranged such that like poles are adjacent to each other along the radial direction. Superconducting material preferably covers the entire surface area under the pole faces of the concentric magnet assemblies. The poles of each of the magnetic assemblies are preferably designed to be magnetically balanced, accounting for the differences in radial location and the presence of the surrounding magnetic assemblies as described further hereinbelow.

An advantage of using multiple concentric rings 46 is that the bearing 10 can be produced with greater radial stiffness. The magnetic flux gradient can be higher for each individual ring 46. This increases the stiffness for each individual ring 46, which increases the stiffness for overall bearing 10.

The alternating polarity embodiment shown in FIG. 8 is generally preferred over the single direction polarity embodiment illustrated in FIG. 7. A ring pair 48, as referred to herein, comprises two adjacent permanent magnet rings coupled with a high magnetic permeability material cap. In the alternating polarity design shown in FIG. 8, the poles line up between adjacent ring pairs 48, that is, the north is next to the north and the south is next to the south. Because of this, the gap between ring pairs 48 can be reduced or even eliminated. In the single direction design shown in FIG. 7, a larger gap must be maintained to avoid short-circuiting of the fields. This increases the bearing size and reduces the most efficient use of material.

To achieve efficient use of magnetic material, the magnetic flux between concentric rings 46 must be balanced. For generally uniform magnetic materials, balancing is performed by placing the same mass of magnetic material in each ring 46. Accordingly, a ring 46 closer to the bearing's axis of rotation 40 preferably has a greater radial thickness than a ring 46 further away from the axis of rotation 40. If it is desirable to maintain the same radial thickness for all the rings 46, an alternative approach varies the strength of the magnetic material from one ring to the next.

Accordingly, advantages of the invention include: (1) reduced eddy currents from HTS; (2) enhanced magnetic fields in the HTS bearing gap region, and thus increased levitation pressure, from the permanent magnets; and (3) good mechanical integrity of the rotating permanent magnets at high speed.

While the invention has been described in relation to an HTS bearing for flywheel energy storage applications, the basic features of the invention have application to magnetic bearings in general and for a variety of applications involving rotating machinery. Further, while preferred embodiments have been illustrated and described, it should be understood that changes and modifications can be made therein without departing from the invention in its broader aspects. Various features of the invention are defined in the following claims.

What is claimed is:

1. A high temperature superconducting bearing, comprising:

a permanent magnet rotor levitated by a high temperature superconducting structure, said permanent magnet rotor comprising a plurality of concentric permanent magnet rings coupled to a plurality of first permanent magnet ring structures having substantially triangular cross-sections which are coupled to a second permanent magnet ring structure having a substantially quadrangular cross-section, said first and second ring structures having mating boundary faces enabling magnetic flux lines to pass substantially perpendicularly through said boundary faces.

2. The bearing as defined in claim 1, further including concentric bands abutting said permanent magnet rings.

3. The bearing as defined in claim 2, wherein said concentric bands are dimensioned to compress said permanent magnet rings.

4. The bearing as defined in claim 2, wherein said concentric bands comprise a composite material.

5. The bearing as defined in claim 2, wherein said concentric bands comprise steel.

6. The bearing as defined in claim 2, wherein said concentric bands comprise a plurality of steel wires.

7. The bearing as defined in claim 1, wherein at least one of said first permanent magnet ring structures and said second permanent magnet ring structure comprises permanent magnet structures abutting concentric bands.

8. A high temperature superconducting bearing, comprising:

a permanent magnet rotor levitated by a high temperature superconducting structure, said permanent magnet rotor comprising a plurality of concentric permanent magnet rings coupled to a plurality of first permanent magnet ring structures having substantially triangular cross-sections which are coupled to a second permanent magnet ring structure having a substantially quadrangular cross-section and comprising a plurality of substantially square structures and a plurality of substantially triangular structures.

9. The bearing as defined in claim 8, wherein at least one of said first permanent magnet ring structures and said second permanent magnet ring structure comprises permanent magnet structures abutting concentric bands.

10. The bearing as defined in claim 8, further including concentric bands abutting said permanent magnet rings.

11. The bearing as defined in claim 10, wherein said concentric bands are dimensioned to compress said permanent magnet rings.

12. The bearing as defined in claim 10, wherein said concentric bands comprise a composite material.

13. The bearing as defined in claim 10, wherein said concentric bands comprise steel.

14. The bearing as defined in claim 10, wherein said concentric bands comprise a plurality of steel wires.

* * * * *

UNITED STATES PATENT AND TRADEMARK OFFICE
CERTIFICATE OF CORRECTION

PATENT NO. : 5,554,583
DATED : September 10, 1996
INVENTOR(S) : Hull, et al.

It is certified that error appears in the above-indentified patent and that said Letters Patent is hereby corrected as shown below:

Title page, item [75], omit "Abdoud" and insert -- Abboud --;

Column 2, line 4, omit "rerun" and insert -- return --;

Column 3, line 9, omit "rerun" and insert --return--.

Signed and Sealed this

Tenth Day of June, 1997

Attest:

BRUCE LEHMAN

*Attesting Officer*  *Commissioner of Patents and Trademarks*